Patented Apr. 7, 1953

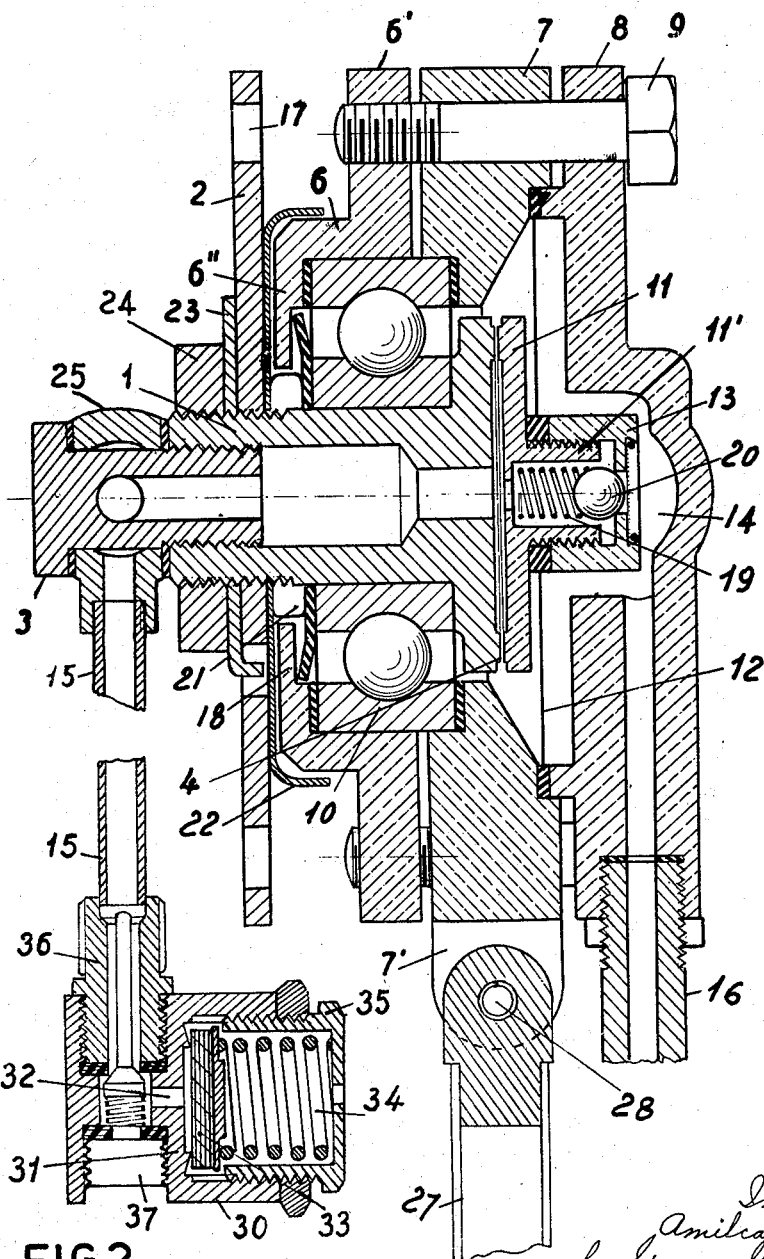

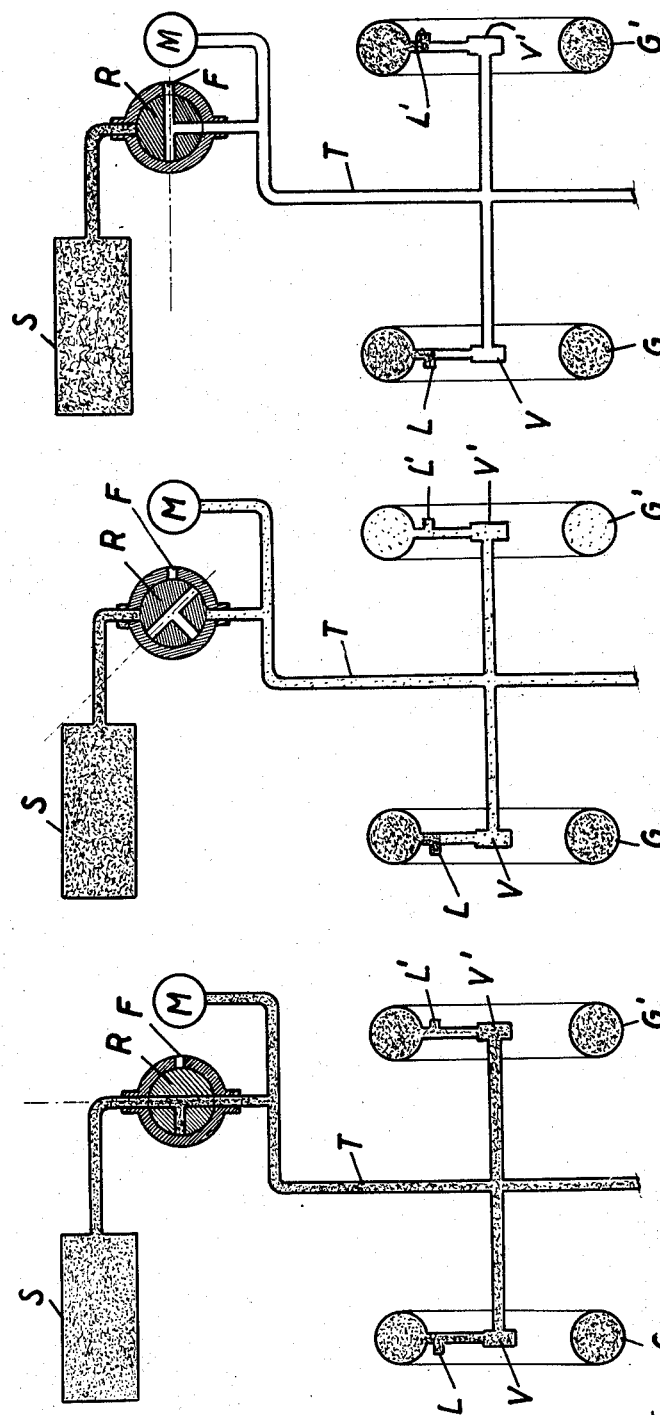

2,633,889

UNITED STATES PATENT OFFICE 2,633,889

MEANS FOR CHECKING AND ADJUSTING THE AIR PRESSURE IN TIRES

Amilcare Vignini, Falconara Marittima (Ancona), Italy

Application November 12, 1949, Serial No. 126,739
In Italy December 22, 1948

3 Claims. (Cl. 152—417)

The present invention has for its object an arrangement for checking and adjusting the pressure in vehicle tires whereby it is not only possible to check the air pressure in such tires even during the progression of the vehicle but also to inflate the tires or at least those that have suffered a small loss of air, even with the vehicle running.

According to the invention, this is performed by securing to each wheel hub an air-feeding connection the members of which connection engage fluid-tightly only when a predetermined pressure prevails inside the air feed pipe. Such a connection includes consequently a non-rotary portion connected with a pipe feeding compressed air from a tank and a rotary part rotating with the wheel and associated with the first non-rotary part in a manner such that when compressed air is fed into the connection, the first part considered is urged into engagement with the rotary part so as to form a sliding fluid-tight engagement for the connection through which it is possible to inflate the tires through the agency of a special valve opening into the tire-inflating tube. By reason of this manner of working, the connection considered will be termed hereinafter the pneumatic clutch connection or, in short, the connection.

The valve fitted over the tire-inflating pipe acts also as a pressure-limiting valve. As a matter of fact, if for any reason whatever, such as e. g. a rise in temperature or the introduction of an excess of compressed air, the pressure of air in the tires rises beyond a predetermined limit, the pressure-limiting valve allows the air to escape until a predetermined gauged limit is reached.

Accordingly, the invention provides for a complete arrangement including the following chief parts:

A pneumatic clutch joint for each wheel.
A valve on each tire-inflating tube.
A pipe feeding in parallel the different connections and the pressure existing inside which is indicated by a manometer.
A control instrument constituted by a three-way cock.

The invention will be better understood through the reading of the following disclosure, reference being made to accompanying drawings, wherein:

Fig. 1 is an axial cross-section through a pneumatic clutch joint.

Fig. 2 is an axial cross-section through a valve to be associated with each tire.

Figs. 3, 4, 5 illustrate diagrammatically an arrangement according to the invention, its operation being shown in three successive stages.

Referring to Fig. 1, the pneumatic clutch joint includes a first part to be fitted to the wheel for rotation in unison therewith, said part being illustrated in the left hand portion of Fig. 1, and a non-rotary part rigid with the body of the vehicle frame. Between the rotary and non-rotary parts of the connection is fitted a ball bearing 10.

The non-rotary part comprises a cover 8 provided with a duct communicating with a yielding pipe 16 communicating in its turn with the pipe feeding compressed air.

The cover 8 is rigidly and yieldingly mounted on a thick annular member 7 mounted in its turn on a further annular member 6 including a central cylindrical part provided with an outer flange 6' through which said annular member 6 is rigidly secured to the above mentioned elements 7 and 8 through bolts 9; said annular member 6 is provided furthermore with an inner flange 6" forming an abutment for the ball bearing 10 with the interposition of a protecting washer 18. The whole non-rotary part thus constituted is connected with the body of the vehicle by means of a stay 27 that may be of the telescopic or spring type, said stay 27 being rockably secured to the pivot 28 carried between two depending lugs 7' on the member 7.

Between the cover 8 and the annular member 7 is fluid-tightly clamped a yielding diaphragm 12 at the center of which is secured a disc 11 the surface of which, directed towards the rotary part to be described hereinafter, assumes a perfect polish. Said disc 11 that forms the movable sliding portion of the connection carries a hollow hub 11' the bore in which carries a spring 19 that urges a ball 20 against the axial perforation of a cap 13 fitted over the hub 11'. The system 11—13—19—20 forms an automatic ball valve the opening in which, adapted to allow the entrance of air, is preferably protected by a sleeve or the like air filtering means.

The rotary part of the connection includes a hollow cylindrical body 1 ending with a disc-shaped expansion or head 4 the surface of which facing the disc 11 has also a perfect polish. To the cylindrical body 1 is secured the inner ring of the ball bearing 10 and also a shim 21 and a protecting cup 22 against which a disc shaped member 2 is urged through screwing over the outer threaded end of the hollow body 1, said disc shaped member 2 being provided with holes 17 through which may pass the bolts securing the said rotary part to a portion of the wheel, preferably its hub. The disc-shaped member 2 is held fast on the body 1 by means of a safety plate 23 and of a counternut.

In the inner tapped axial bore of the body 1 is screwed a body 3 including a cylindrical sleeve closed by a solid head and provided with radial channels through the sleeve wall opening into the bore thereof. Over said body 3 is fitted a sleeve 25 with inner concave walls defining an inner recess communicating through a radial port with a connecting tube 15 communicating in its turn through its other end with a special valve illustrated in Fig. 2 that is carried by the tire-inflating tube.

The above described arrangement operates as follows: when the tube 16 contains no compressed air, the polished surfaces 11 and 4 are spaced with reference to one another and consequently the disc-shaped head 4 may rotate freely without any contact with the cooperating disc 11.

When introducing compressed air into the chamber 14 of the connection, the diaphragm 12 is tensioned and urges the disc-shaped member 11 into contact with the cooperating member 4 after which the compressed air opens the ball valve 20 and enters through the openings in the members 11', 4, 1 and 3 into the annular recess defined inside the sleeve 25 and surrounding the member 3 and thence through the pipe 15 into the valve 36 (Fig. 2) so as to inflate the tire.

The pressure-limiting valve illustrated in Fig. 2 replaces the standard non return valve and prevents any exaggerated inflation of the tire.

Said valve includes a hollow cylindrical body 30 the bottom of which 31 is perforated at 32 and is machined so as to form a seat for a valve 33 urged by a spring 34 against the seat, the force exerted by said spring being adjusted by means of a cap 35 having a perforated bottom and that is screwed into the body 30.

Beyond the bottom 31 of the above described valve, the body 30 shows a second transversal bore wherein an automatic valve may move between the connecting members 36 and 37 inserted in the ends of the bore, said automatic valve being urged into its closing position by a spring while it may be opened by a stream of compressed air fed by the tube 15 communicating with the connection 4—11'. The connecting member 37 may be screwed over the small inflating tube of the tire after removal of its needle valve.

The valve described allows thus the inflation of the tire while preventing the escape of air out of it unless the pressure in said tire rises beyond a predetermined limit, because then the excess pressure would be released through the port 32 over the valve 33 that would be then raised by said excess pressure.

The mounting and operation of the above disclosed arrangement are illustrated in Figs. 3, 4 and 5 wherein the sliding connections are designated by the letter V or V', the valves by L and L', a manometer by M and a common supply tank for compressed air by S.

The tires G, G' are connected through a valve L or L' and a connection V or V' with an air feed pipe T that may be connected with the air supply tank S or with the atmosphere or else isolated through the operation of the three way cock R. The pressure in the pipe T is indicated by the manometer M. The cock and the manometer are mounted preferably on the vehicle board.

Fig. 3 illustrates the position of the cock during inflation for which position the tank S communicates with the pipe T.

For this position, the connections V, V' are in clutch; in other words, the members 4 and 11 illustrated in Fig. 1 are in relative sliding fluid-tight contacting relationship. In Fig. 5 is illustrated the normal position of the cock during the running of the vehicle; in this position, the cock R opens the pipe T into the atmosphere through the port F. In this position, the sliding parts 4 and 11 in the connections V and V' are released with reference to one another.

However, it is of interest to control from time to time the pressure inside the tires.

For this purpose, the cock R is first caused to enter the position illustrated in Fig. 3 and after a few seconds, the entrance of air from the tank S into the pipe P is cut off as illustrated in Fig. 4. There is then established in a very short time a balance of the pressures between the pipe T and the tire G' that is less inflated than the other tires and the manometer M gives out this pressure, as prevailing in the tire considered. If this pressure is too low, it is possible to inflate the less inflated tire or tires by bringing the cock back into the position of Fig. 3 and then into the checking position illustrated in Fig. 4. These operations are repeated until the pressure indicated by the manometer for the position illustrated in Fig. 4 is sufficient following which the cock is returned into its position for normal running conditions as illustrated in Fig. 5. In case of continuous losses of the tires, the inflation may be repeated without stopping the vehicle.

The invention is, of course, not limited to the embodiment described that has been disclosed by way of a mere exemplification. It should, however, be well understood that the execution of the pneumatic clutch joint may be modified, provided the latter includes a joint in two parts of which one is rotary and the other is non-rotary, said latter part rotating either freely or in frictional fluid-tight contacting relationship with the stationary part according to the step of operation considered. The pressure-limiting valve may also be of any other type, provided it operates in the manner disclosed. In certain cases, it is also possible to cut out this valve and to replace it by a suitable non-return valve.

What I claim is:

1. A communicating fluid tight joint between two relatively rotatable parts, a chamber in the first of said parts, a diaphragm in said chamber dividing said chamber into two compartments and fluid tightly sealing said compartments from each other, a valve body fluid tightly secured to the middle part of said diaphragm, a channel through said valve body establishing communication between said compartments, a check valve in said channel preventing fluid flow in one direction therethrough, a channel through the second part of said joint opening towards said first-mentioned channel, registering secular surfaces on said valve body and on said second part said surfaces surrounding said channels and normally separated slightly from each other, and means for connecting one of said compartments with a source of pressure fluid, whereby application of said pressure fluid first causes said diaphragm to deflect and bring said secular surfaces into sealing engagement with each other and then opens said check valve to admit the pressure fluid from the channel in said first part into the channel in said second part.

2. A joint as set forth in claim 1, in which said check valve is a spring actuated ball valve.

3. In a compressed air system for pneumatic tires on a vehicle, a source of compressed air, valved pipe connections between said source of compressed air and said tires, a communicating fluid tight joint in each of said pipe connections between a first part fixedly connected in said pipe connection and a second part secured to and rotatable with a wheel carrying said tire, a chamber in said first part, a diaphragm in said chamber dividing said chamber into two compartments and fluid tightly sealing said compartments from each other, a valve body fluid tightly secured to the middle part of said diaphragm, a channel through said valve body establishing communication between said compartments, a check valve in said channel preventing return flow of compressed air, a channel through the second part of said joint opening towards said first-mentioned channel, registering secular surfaces on said valve body and on said second part said surfaces surrounding said channels and normally separated slightly from each other, and means for connecting one of said compartments with said source of compressed air through said pipe connection, whereby application of said pressure fluid first causes said diaphragm to deflect and bring said secular surfaces into sealing engagement with each other and then opens said check valve to admit the compressed air from said source thereof to said tire through said channels.

AMILCARE VIGNINI.

REFERENCES CITED

The following references are of record in the file of this patent:

UNITED STATES PATENTS

| Number | Name | Date |
| --- | --- | --- |
| 1,072,907 | Brooks | Sept. 9, 1913 |
| 1,297,239 | Potter | Mar. 11, 1919 |
| 1,796,482 | Schmidt | Mar. 17, 1931 |
| 2,107,405 | Williams | Feb. 8, 1938 |
| 2,156,841 | Davis | May 2, 1939 |
| 2,168,690 | Uksila | Aug. 8, 1939 |
| 2,213,539 | Wiegand | Sept. 3, 1940 |
| 2,529,731 | Hollerith | Nov. 14, 1950 |

FOREIGN PATENTS

| Number | Country | Date |
| --- | --- | --- |
| 382,325 | France | Dec. 5, 1907 |